United States Patent
Moya

(10) Patent No.: US 6,179,132 B1
(45) Date of Patent: *Jan. 30, 2001

(54) SURFACE MODIFIED POLYMERIC SUBSTRATE AND PROCESS

(75) Inventor: Wilson Moya, Concord, MA (US)

(73) Assignee: Millipore Corporation, Bedford, MA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/041,699

(22) Filed: Mar. 13, 1998

(51) Int. Cl.[7] .......................... B01D 71/26; B01D 71/36; B01D 69/10

(52) U.S. Cl. .............. 210/490; 210/500.36; 210/500.27; 264/41; 427/244; 427/245

(58) Field of Search .................... 210/490, 500.36, 210/500.27; 264/41; 427/244, 245

(56) References Cited

U.S. PATENT DOCUMENTS

| | | | |
|---|---|---|---|
| 2,393,967 | 2/1946 | Brubaker | 260/80 |
| 2,559,752 | 7/1951 | Berry | 260/29.6 |
| 2,593,583 | 4/1952 | Lontz | 260/92.1 |
| 3,041,317 | 7/1962 | Gibbs et al. | 260/79.3 |
| 3,282,875 | 11/1966 | Connolly et al. | 260/29.6 |
| 4,151,052 | 4/1979 | Goto et al. | 204/95 |
| 4,209,367 * | 6/1980 | Seko et al. | 204/298 |
| 4,259,226 | 3/1981 | Suhara et al. | 260/33.4 F |
| 4,327,010 | 4/1982 | Suhara et al. | 524/388 |
| 4,348,310 | 9/1982 | Silva et al. | 524/167 |
| 4,386,987 | 6/1983 | Covitch et al. | 156/155 |
| 4,433,082 | 2/1984 | Grot | 524/755 |
| 4,453,991 | 6/1984 | Grot | 156/94 |
| 4,470,859 | 9/1984 | Benezra et al. | 156/155 |
| 4,902,308 | 2/1990 | Mallouk et al. | 55/16 |
| 4,990,294 | 2/1991 | Yen et al. | 264/41 |
| 5,032,274 | 7/1991 | Yen et al. | 210/500 |
| 5,094,895 | 3/1992 | Branca et al. | 428/36.91 |
| 5,183,545 | 2/1993 | Branca et al. | 204/252 |
| 5,630,941 * | 5/1997 | Burger et al. | 210/490 |
| 5,716,680 | 2/1998 | Martin et al. | 427/601 |
| 5,928,792 * | 7/1999 | Moya | 428/422 |
| 5,976,380 * | 11/1999 | Moya | 210/650 |

FOREIGN PATENT DOCUMENTS

WO9524976  9/1995 (WO) .

* cited by examiner

*Primary Examiner*—Ana Fortuna
(74) *Attorney, Agent, or Firm*—John Dana Hubbard, Esq.; Timothy J. King, Esq.; Paul J. Cook, Esq.

(57) ABSTRACT

A porous membrane is provided which is formed from a porous polyperfluorocarbon membrane substrate having its surface modified with a perfluorocarbon polymer composition. The modified surface is directly wet with an aqueous liquid.

16 Claims, No Drawings

SURFACE MODIFIED POLYMERIC SUBSTRATE AND PROCESS

BACKGROUND OF THE INVENTION

1. Field of the Invention

This invention relates to a porous polyperfluorocarbon membrane having a water wettable surface. More particularly, this invention relates to a porous polyperfluorocarbon membrane having a water wettable surface formed of a perfluorocarbon polymer including hydrophilic functional groups.

2. Description of the Prior Art

Polyperfluorocarbon membranes are useful in a wide variety of environments due to the chemical inertness of the membrane. By the term "polyperfluorocarbon" as used herein is meant homopolymers of a perfluorocarbon as well as polymers formed from more than one monomer at least one of which is a perfluorocarbon including copolymers or terpolymers or a polymeric blend of such homopolymers and/or polymers or the like. Examples of polyperfluorocarbons include polytetrafluoroethylene (PTFE), fluorinated ethylene-propylene copolymer (FEP) and perfluoro-alkoxy polymer (PFA or MFA).

Porous membrane filters are utilized in a wide variety of environments to separate materials within a fluid stream. Membranes are formed from a solid polymeric matrix and have highly precisely controlled and measurable porosity, pore size and thickness. In use, the membrane filters generally are incorporated into a device such as a cartridge which, in turn, is adapted to be inserted within a fluid stream to effect removal of particles, microorganisms or a solute from liquids and gases.

To be useful, membrane filters must be resistant to the fluid being filtered so that it maintains its strength, porosity, chemical integrity and cleanliness. For example, in the manufacture of microelectronic circuits, membrane filters are used extensively to purify various process fluids to prevent contaminants from causing circuit failures. Fluid filtration or purification is usually carried out by passing the process fluid through the membrane filter under a differential pressure across the membrane which creates a zone of higher pressure on the upstream side of the membrane than on the downstream side. Thus, liquids being filtered in this fashion experience a pressure drop across the membrane filter. This pressure differential also results in the liquid on the upstream side having a higher level of dissolved gases than the liquid on the downstream side. This occurs because gases, such as air, have greater solubility in liquids at higher pressures than in fluids at lower pressures. As the liquid passes from the upstream side of the membrane filter to the downstream side, dissolved gases come out of solution in the membrane resulting in outgassing of the liquid. Outgassing of a liquid can also occur spontaneously without a pressure differential as long as the liquid contains dissolved gases and there is a driving force for the gases to come out of solution, such as nucleating sites on the surfaces of a membrane where gas pockets can form and grow. Outgassing liquids typically used in the manufacture of semiconductors and microelectronic devices usually include very high purity water, ozonated water, organic solvents such as alcohols, and others which are generally significantly chemically active, such as concentrated and aqueous acids or bases which can contain an oxidizer. These chemically active liquids require the use of a chemically inert filter to prevent membrane degradation. Membrane degradation leading to the chemical breakdown of the membrane composition usually results in extractable material which is released from the filter during use, thus compromising the purity, integrity and cleanliness of the fluid being filtered. Polyperfluorocarbon-based membrane filters made from fluorine-containing polymers such as polytetrafluoroethylene, or PFA are commonly utilized in these applications. Fluorine-containing polymers are well known for their chemical inertness, or excellent resistance to chemical attack. One disadvantage of fluorine-containing polymers is that they are hydrophobic and therefore membranes made from such polymers are difficult to wet with aqueous fluids or other fluids which have surface tensions greater than the surface energy of the membrane. In order to wet the surface of a hydrophobic membrane with water or an aqueous fluid, it is current practice to first wet the surface with an organic solvent, followed by contact of the surface with a mixture of water and an organic solvent and then followed by contact with water or an aqueous fluid. Alternatively, hydrophobic membranes can be wet with $H_2O$ under pressure. This process is time consuming, expensive and often ruptures the membrane. Moreover, this process does not ensure that a substantial portion of the pores in the membrane are completely intruded with water.

Another problem often encountered during the filtration of outgassing liquids with a hydrophobic membrane filter is that the membrane provides nucleating sites for dissolved gases to come out of solution under the driving force of the pressure differential, during the filtration process. Gases which come out of solution at these nucleating sites on the hydrophobic membrane surfaces, including the interior pore surfaces and the exterior or geometric surfaces, form gas pockets which adhere to the membrane. As these gas pockets grow in size due to continued outgassing, they begin to displace liquid from the pores of the membrane ultimately reducing the effective filtration area of the membrane. This phenomenon is usually referred to as dewetting of the membrane filter since the fluid-wetted, or fluid-filled portions of the membrane are gradually converted into fluid-nonwetted, or gas-filled portions where filtration ceases and which results in a reduction of the overall filtration efficiency of the filter.

In contrast, self wetting hydrophilic membranes are spontaneously wet upon contact with an aqueous liquid so that a treatment process for wetting its surface is not required. That is, no prior treatment with an organic solvent or pressure intrusion, or mechanical energy such as by stirring is required in order for the membrane surface to be wet with water. It has been proposed in U.S. patent application Ser. No. 08/848,809, filed May 1, 1997, which is incorporated herein by reference, to provide a process for modifying a surface of a porous membrane such as a polyperfluorocarbon membrane with a bound perfluorocarbon copolymer composition to render the entire surface non-dewetting. A porous membrane substrate is intimately contacted with a perfluorocarbon copolymer composition in a solvent or diluent. Excess perfluorocarbon copolymer composition is removed from the surface with a solvent or diluent for the copolymer. The solvent or diluent does not remove the perfluorocarbon copolymer composition bound to the membrane surface. The membrane having the copolymer composition bound to its surface then is heat treated to improve the bond between the membrane substrate and the surface modifying perfluorocarbon copolymer composition. The perfluorocarbon copolymer composition is utilized in concentrations and amounts so that the membrane surface is completely modified while avoiding substantial blocking or plugging of the membrane pores. Complete surface modification can be determined by staining with Methylene Blue dye. In order to wet the surface modified membrane with water, it is first necessary to prewet the membrane with an organic solvent such as isopropanol (IPA). Thus, the surface modified membranes are not directly wet with water. In addition, these membranes must be maintained in contact with water or an aqueous solution in order to prevent the membrane from drying out. If the membranes are allowed to become even partially dried, the dried portion of the membrane must be wet via the complex process of contact with organic solvent, then with a mixture of an organic solvent and water and then with water or an aqueous solution.

When modifying a membrane surface it is essential that the surface modification be effected without substantially reducing the membrane porosity. Thus, sufficient surface modifying composition must be applied to effect the desired modification without substantially plugging the pores of the membrane substrate. Thus, the membrane having its surface modified should retain sufficient porosity to permit its use as a filtration membrane. These criteria require than an intermediate amount of surface modifying compositions be applied to a membrane substrate and therefore differ from coating a solid substrate such as films, powders or fibers.

International Application NO. WO95/24976 published Sep. 21, 1995 discloses a process for forming a thin coating of an ion containing polymer such as a perfluorosulfonic acid ionomer on a substrate such as powders, fibers, fabrics or films formed of a fluorinated polymer such as PTFE. The coating is effected from an aqueous solution of the ionomer which can contain alcohol. When coating fibers or powder, it was found that it is necessary to add a solution of the ionomer to the powder or fibers rather than adding the powder or fibers to the solution in order to attain the desired surface modification. In addition, it was found that the resultant mixture of solution and powder or fibers must be subjected to high shear conditions to effect the desired modification of the powder or fibers surfaces. When processing a film, the film is first immersed in an alcohol-containing solution of the ionomer followed by the necessary step of immersing the thus-treated film with a solution of a salt or a strongly ionized acid. The salt or acid treating step is necessary in order to obtain strongly adherent coatings on the substrate. It is also disclosed that after the treated film has been dried, it is necessary to utilize stirring energy to rewet the treated film when it is immersed in an aqueous solution in order to effect rewetting of the film. There is no disclosure of producing a membrane product which is directly wettable with water after being dried.

U.S. Pat. No. 5,716,680 discloses a process for coating powders or fiber made of a fluorinated polymer such as PTFE with an ion containing polymer such as a perfluorosulfonic acid ionomer. Consistent with the disclosure of International Application NO. WO95/24976, it is disclosed that it is necessary to add a solution of the ionomer to the powder or fiber to the solution to obtain the desired surface modification and that high shear conditions must be used on the mixture of ionomer solution and powder or fibers to attain the desired surface modification. There is no disclosure of producing a membrane product which is directly wettable with water after being dried.

U.S. Pat. No. 4,470,859 to Benezra et al, discloses a process for modifying the surfaces of microporous substrates formed of a fluorocarbon such as polytetrafluoroethylene, with a coating of a perfluorocarbon polymer composition including hydrophilic functional groups from a solution of the polymer composition to render the surface of the membrane more water wettable. The perfluorocarbon polymer composition is dissolved in a non-aqueous solvent at elevated temperature. The membrane then is immersed into the solution which, in turn, is placed into a vacuum chamber. The pressure within the chamber then is reduced such as to approximately 150 millimeters of mercury (absolute) to remove air from within the filter. Thereafter, the pressure within the chamber is quickly returned to atmospheric pressure. This coating process is repeated to ensure, what is described by Benezra et al., complete solution penetration into the pores of the membrane. By proceeding in this manner, the membrane surfaces and the interior walls defining the interstices within the membrane are coated with the perfluorocarbon polymer composition. Following the coating step, the solvent is removed by evaporation using heat and vacuum, or the solvated perfluorocarbon polymer composition is precipitated with a substance in which the perfluorocarbon polymer composition is effectively insoluble. The solvents utilized to form the solution include halocarbon oil, perfluorooctanoic acid, decafluorobiphenyl, N-butylacetamide, and N, N-dimethylacetamide.

U.S. Pat. No. 4,433,082 and 4,453,991 disclose a process for forming solutions of a perfluorinated ion exchange polymer such as copolymers of tetrafluoroethylene and methyl perfluoro (4,7-dioxa-5-methyl-8-nonenoate) or perfluoro (3,6-dioxa-4-methyl-7-octene sulfonyl fluoride) utilizing organic solvents which are relatively innocuous as compared to the solvents utilized in the coating process set forth above. The perfluorinated ion exchange polymers are dissolved in alcoholic solvents such as isopropanol at elevated temperature and pressure. The solutions obtained are disclosed as being useful in making and repairing films and non-porous membranes used in electrolytic processes such as aqueous sodium chloride electrolysis, in coating substrates such as catalyst supports for use in promoting a wide variety of chemical reactions, for coating porous diaphragms to convert them into non-porous articles and in recovering used perfluorinated polymers having sulfonic acid or sulfonate functional groups for reuse. In electrolytic processes, such as disclosed by these patents, extractables derived from the coated diaphragms are not a substantial concern and porosity of the modified diaphragm is disadvantageous.

Solutions of sulfonyl fluoride-containing fluoropolymers are also disclosed in U.S. Pat. No. 4,348,310. The solvents utilized therein are completely halogenated, saturated hydrocarbons, preferably having at least one terminal sulfonyl fluoride polar group. The solutions are disclosed as being used to repair holes in membranes made from fluorinated polymers and for making ion exchange film membranes, dialysis membranes, ultrafiltration and microfiltration membranes. Another disclosed use for these solutions is to coat porous diaphragms for electrochemical cells by contacting a diaphragm with the solution followed by evaporating the halogenated solvent and then hydrolyzing the coated diaphragm to convert the sulfonyl fluoride groups to the acid or salt form.

U.S. Pat. No. 4,902,308 to Mallouk et al, also describes a process for modifying the surface of a porous, expanded polytetrafluoroethylene membrane with a perfluoro-cation exchange polymer from an organic solution of the polymer.

U.S. Pat. No. 4,259,226 and 4,327,010 disclose modifying a porous membrane surface with a fluorinated polymer having carboxylic acid salt groups. No process steps are disclosed for controlling extractables from the membrane or for controlling the extent of binding of the modifying composition to the membrane surface. U.S. Pat. No. 5,183, 545 and 5,094,895 disclose a process for making a multilayer, composite, porous diaphragm from a porous, multilayer, expanded polytetrafluoroethylene substrate having its surface modified with a perfluoro ion exchange polymer composition. The modifying polymer composition can contain a surfactant and may contain excess modifying composition, both of which are sources of undesirable extractables.

Polymeric surfaces, such as polymeric membrane surfaces modified with a perfluorocarbon polymer composition including hydrophilic functional groups and derived from an organic solution of the perfluorocarbon polymer composition are not directly wettable with water. In order to wet these modified surfaces with water, it is first necessary to intimately contact the modified surface with an organic solvent such as an alcoholic composition which is miscible with water. The modified surface and organic solvent then are intimately contacted with a mixture of water and the organic solvent and finally washed with water. By operating in this manner, the water penetrates the pores of the membrane and renders the membrane useful for passing aqueous solutions therethrough, such as during a filtration process. A characteristic of these water-wet modified surfaces is that they must remain in contact with water in order to render them useful for passing aqueous compositions therethrough. Should these modified surfaces become dry, they must be rewet with an organic solvent and water as described above since these membrane surfaces are not inherently water-wettable. This is undesirable since this rewetting process requires downtime of the filtration process and is therefore, undesirably expensive. In addition, the use of the organic solvent provides an undesirable source of contamination. In view of the non-self wetting properties of these modified membrane surfaces, the membranes or devices utilizing the membranes are shipped immersed in water or, when sold dry, require the customer to perform the wetting process described above.

Accordingly, it would be desirable to provide a porous membrane having its entire surface modified with a perfluorocarbon polymer composition including hydrophilic functional groups which surface is directly wettable with water. That is, the surface is wet with water by direct contact with water while avoiding the necessity of prior contact with an organic solvent or pressure intrusion or of energy such as shearing force after being dried. In addition, it would be desirable to provide such a membrane which is highly resistant to chemical attack, such as a membrane formed of at least one fluorine-containing polymer membrane substrate.

SUMMARY OF THE INVENTION

This invention is based upon the discovery that a perfluorocarbon polymer composition including hydrophilic functional groups solubilized in an aqueous based liquid, can be deposited as a superstrate on a polyperfluorocarbon membrane substrate to render the substrate surface hydrophilic without impairing inertness of the substrate and without significantly adversely affecting the porosity of the porous substrate. Furthermore, the present invention is based upon the discovery that a perfluorocarbon polymer deposited on a polyperfluorocarbon surface from a substantially aqueous solution renders the modified surface directly wettable with an aqueous liquid, such as water. This directly wettable surface, so-modified, differs from surfaces of the prior art modified with a perfluorocarbon polymer composition deposited from a solution of water and an organic solvent or an organic solvent alone in that the modified surface of the prior art is not directly wettable with an aqueous solution. In addition, the directly wettable surface of the modified membrane of this invention does not require the use of a shearing force while in contact with water in order to rewet the modified surface. That is, the so-modified surface of the prior art requires initial contact with an organic solvent prior to contact with water or the use of a shearing force while in contact with water in order to permit the surface to be wet with water. By the term "solution" as used herein is meant a liquid composition which contains a completely dissolved and/or partially dissolved perfluorocarbon polymer composition in a solvent, diluent or dispersant medium which may contain the perfluorocarbon polymer composition in dispersion or in micellar form.

In one aspect, the present invention provides a process for making a porous polyperfluorocarbon membrane substrate having its surfaces, including the interior pore surfaces and the exterior, geometric surfaces, completely modified with a deposited and bound perfluorocarbon polymer composition so that the modified surface, when dry, is directly wettable with water. The surface modified membrane has a hydrophilic surface and is inert even against strong reagents such as acids and bases which can include an oxidizer. The perfluorocarbon polymer composition is deposited in a manner so that it is bound to the polymer substrate surfaces. By the term "bound" as used herein is meant that the surface modifying perfluorocarbon polymer composition is substantially nonextracted and substantially unreactive in an aqueous solution. An aqueous solution substantially free of organic solvent, is preferably prepared by dissolving the perfluorocarbon polymer composition including hydrophilic functional groups in a solvent comprising water and an organic solvent miscible with water. Thereafter, the solution is treated such as with heat and/or subatmospheric pressure to selectively remove the organic solvent from solution. When necessary, sufficient water is added to the solution to assure that the perfluorocarbon polymer composition remains in solution. The resulting aqueous solution of the perfluorocarbon polymer composition is substantially free of organic solvents. However, it can contain trace quantities of the originally included organic solvent or azeotropic compositions of water and the originally included organic solvent.

In the process of this invention, the polyperfluorocarbon membrane substrate first is contacted with a liquid composition which wets the substrate surface. The aqueous solution of the perfluorocarbon polymer composition then is contacted with the polyperfluorocarbon porous membrane substrate such as by immersion of the substrate in the aqueous solution or by passing the aqueous solution through the substrate under pressure or by intruding the membrane pores under pressure without rupturing the membrane. The aqueous solution referred to herein comprises a liquid composition which contains an at least partially dissolved perfluorocarbon polymer composition in water substantially free of an organic solvent. The solution also can contain additional compositions other than an organic solvent including a solute such as a salt, an acid and/or a base. It is a requirement that the aqueous solution completely enter the membrane pores to enable contact of the internal pore surfaces with the aqueous solution of the perfluorocarbon polymer composition. The surfaces of the modified membrane produced thereby are modified with the perfluorocarbon polymer composition and are directly wet upon contact with water even when dry, without the use of an organic solvent or a shear force.

The surface modified polyperfluorocarbon polymer surface is preferably completely modified with a bound perfluorocarbon polymer composition in those areas of the membrane contacted with the perfluorocarbon polymer composition.

The membranes made in accordance with this invention are directly wet with water or other aqueous based liquids even from a dry state of the membrane. Furthermore, since the composition effecting surface modification of the membrane of this invention is formed from a perfluorocarbon polymer composition, the modified surface as well as the polyperfluorocarbon membrane substrate is also inert in that it is highly resistant to chemical attack. In addition, the perfluorocarbon polymer composition does not promote the nucleation of gases on the surfaces of the membrane when filtering an outgassing liquid. Thus, when filtering an outgassing liquid, the effective life of the membranes of this invention is significantly greater than the effective life of unmodified polyfluorocarbon membranes which promote the nucleation of gases on their surfaces when filtering an outgassing liquid resulting in dewetting of the membrane.

DESCRIPTION OF SPECIFIC EMBODIMENTS

By the term "wettable" or "wettability" as used herein is meant that a microporous membrane in a dry state readily imbibes and/or absorbs aqueous liquids into substantially all of its porous structure without the use of heat, pressure, mechanical energy, surfactants or other prewetting agents. Membranes which have wettability allow one to use such membranes in aqueous filtration applications where aqueous liquids can freely flow through them without dewetting or the necessity to prewet the membrane. By "aqueous liquid" it is meant to include water, aqueous based liquids including but not limited to various aqueous products used in the semiconductor industry such as SCI or SC2, concentrated sulfuric acid with or without an oxidizer such as hydrogen peroxide or ozone and other aqueous based liquids in need of processing such as aqueous solutions of a salt, a base or an acid.

The surface modifying composition of the membrane of this invention comprises a polymer composition known generally as perfluorocarbon polymer compositions such as those marketed by E. I. Dupont de Nemours and Company, Inc. under the name NAFION® or by Asahi Glass Company, Limited under the name FLEMION™, which is bound to the membrane substrate. Other perfluorocarbon polymer compositions are those generally known as perfluorinated ionomers such as those available from Ausimont USA, Inc.

These perfluorocarbon polymer compositions are generally co-polymers of at least two monomers with one monomer being selected from a group of fluorine-containing monomers such as vinyl fluoride, hexafluoropropylene, vinylidene fluoride, trifluoroethylene, chlorotrifluoroethylene, perfluoro(alkylvinyl ether), tetrafluoroethylene and mixtures thereof.

The second monomer is selected from a group of fluorine-containing monomers containing hydrophilic functional groups which bind with water. The hydrophilic functional groups can be or which can be converted to ($SO_2F$), ($SO_3M$), ($SO_3R$), ($SO_2NR_2$), ($PO_3M$), (COF), ($CO_2M$), ($CO_2R$) or ($CONR_2$) groups wherein M is H, an alkali metal, an alkaline earth metal, or $NR_4$ and each R separately is H, an alkyl group or an aryl group such as $CH_3$, $C_2H_5$ or $C_6H_5$, which may, optionally, contain other functional groups such as hydroxyl, amine, ether or carbonyl groups or the like to form substituted alkyl or substituted aryl groups. Alternatively, the perfluorocarbon polymer composition can be a homopolymer of the second monomer.

Examples of such second monomers can be generically represented by the formula $CF_2\!=\!CFR_f\!-\!X$. $R_f$, in the generic formula is a linear or branched bifunctional perfluorinated radical comprising one to eight carbon atoms of any suitable or conventional configuration including those containing ether linkages and which is attached to the vinyl radical $CF_2\!=\!CF$ group directly through a carbon-carbon bond or preferably through an ether linkage. X, in the generic formula is a hydrophilic functional group which can be or which can be converted to an ($SO_2F$), ($SO_3M$), ($SO_3R$), ($SO_2NR_2$), ($PO_3M$), (COF), ($CO_2M$), ($CO_2R$) or a ($CONR_2$) group wherein M is H, an alkali metal, an alkaline earth metal, or $NR_4$ and each R separately is H, an alkyl group or an aryl group such as $CH_3$, $C_2H_5$ or $C_6H_5$, or a substituted alkyl or substituted aryl group. One restraint upon the generic formula is a general requirement for the presence of at least one fluorine atom on the carbon atom adjacent the—X group.

Typically said second monomers containing sulfonyl fluoride groups which can be converted to sulfonyl based ion exchange groups are set forth in U.S. Pat. Nos. 3,282,875; 3,041,317; 3,560,568; 3,718,627 which are incorporated herein by reference and methods of preparation of perfluorocarbon polymer compositions are set forth in U.S. Pat. Nos. 3,041,317; 2,393,967; 2,559,752 and 2,593,583 which are incorporated herein by reference. These perfluorocarbon polymers generally have pendant $SO_2F$ based functional groups which can be converted to ($SO_3M$) groups. In one embodiment of this invention, the surface modifying composition includes pendant carbonyl based functional groups which can be converted to carbonyl based ion exchange groups.

Perfluorocarbon polymers having pendant carbonyl based ion exchange functional groups can be prepared in any suitable conventional manner such as in accordance with U.S. Pat. No. 4,151,052 or Japanese patent application No. 52(1977)38486 which are incorporated herein by reference or polymerized from a carbonyl functional group containing a monomer derived from a sulfonyl group containing monomer by a method such as is shown in U.S. Pat. No. 4,151,052 which is incorporated herein by reference. Illustrative examples of carbonyl fluoride containing monomers include:

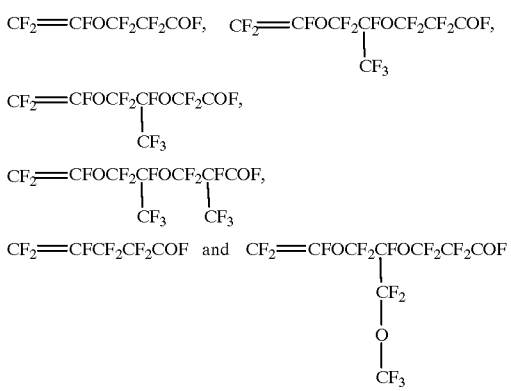

Preferred carbonyl containing monomers include:

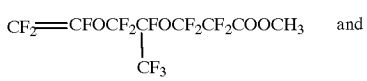

-continued

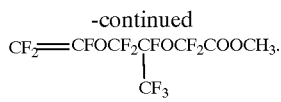

Preferred perfluorocarbon polymer compositions utilized in the present invention therefore include carbonyl and/or sulfonyl based functional groups represented by the formula

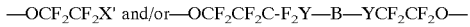

wherein X' is sulfonyl fluoride ($SO_2F$), carbonyl fluoride (COF) sulfonate methyl ester ($SO_3CH_3$), carboxylate methyl ester ($COOCH_3$), ionic carboxylate ($COO-Z^+$) or ionic sulfonate ($SO_3-Z^+$), Y is sulfonyl ($SO_2$) or carbonyl (CO), B is a linkage such as

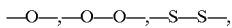

and di and poly amines of the form $NH(CR_1R_2)_xNH$ where $R_1$, $R_2$ are selected from short chain alkanes, alkenes, hydrogen, and amine groups and Z is hydrogen, an alkali metal such lithium, cesium, rubidium, potassium and sodium or an alkaline earth metal such as barium, beryllium, magnesium, calcium, strontium and radium or a quaternary ammonium ion.

The sulfonyl form of the perfluorocarbon polymer composition is typically a polymer having a fluorinated hydrocarbon backbone chain to which are attached the functional groups or pendant side chains which, in turn, carry the functional groups. The pendant side chains can contain, for example,

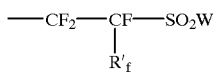

groups wherein R', is F, Cl, or a $C_1$ to $C_{10}$ perfluoroalkyl radical, and W is F or Cl, preferably F. Ordinarily, the functional group in the side chains of the polymer will be present in terminal

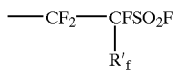

groups which can be attached to the side chain through an ether linkage. Examples of perfluorocarbon polymer compositions of this kind are disclosed in U.S. Pat. No. 3,282,875, U.S. Pat. No. 3,560,568 and U.S. Pat. No. 3,718,627 which are incorporated herein by reference.

Additional examples can be represented by the general formula

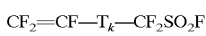

wherein T is a bifunctional fluorinated radical comprising 1 to 8 carbon atoms, and k is O or 1. Substituent atoms in T include fluorine, chlorine, or hydrogen. The most preferred perfluorocarbon polymer compositions are free of both hydrogen and chlorine attached to carbon, i.e., they are perfluorinated, for greatest stability in harsh environments. The T radical of the formula above can be either branched or unbranched, i.e., straight-chain, and have one or more ether linkages. It is preferred that the vinyl radical in this group of sulfonyl fluoride containing comonomers be joined to the T group through an ether linkage, i.e., that the comonomer be of the formula $$CF_2=CF-O-T-CF_2-SO_2F.$$

Illustrative of such sulfonyl fluoride containing comonomers are

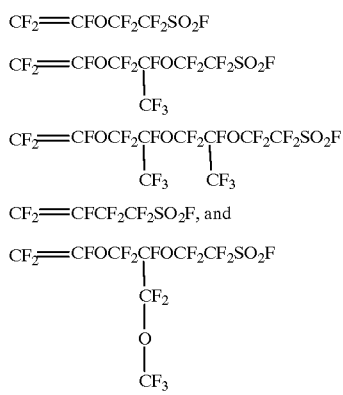

The most preferred sulfonyl fluoride containing comonomer is perfluoro (3,6-dioxa-4-methyl-7-octenesulfonyl fluoride),

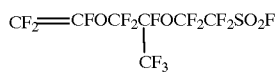

The sulfonyl-containing monomers are disclosed in such references as U.S. Pat. No. 3,282,875, U.S. Pat. No. 3,041,317, U.S. Pat. No. 3,718,627 and U.S. Pat. No. 3,560,568 which are incorporated herein by reference.

A preferred class of perfluorocarbon polymer compositions utilized in the present invention is represented by polymers having the repeating units

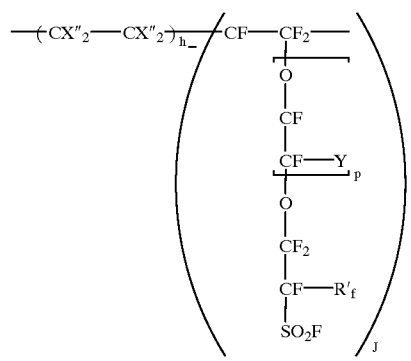

wherein
h is 3 to 15,
j is 1 to 10,
p is 0, 1 or 2,
the X"'s taken together are four fluorines or three fluorines and one chlorine,
Y is F or $CF_3$, and
R'f is F, Cl or a $C_1$ to $C_{10}$ perfluoroalkyl radical.

Any perfluorocarbon polymer composition which contains sulfonyl or carbonyl based functional groups can be used in the process of this invention including polymers which contain both types of functional groups and mixtures of polymers having different functional groups, including homopolymers, copolymers, terpolymers or the like. The most prefelTed sulfonyl containing perfluorocarbon polymer composition is a copolymer of tetrafluoroethylene and perfluoro (3,6-dioxa-4-methyl-7-octenesulfonyl fluoride), from which the sulfonic acid form or the salt form can be obtained. The most preferred carbonyl containing perfluorocarbon polymer composition is a copolymer of tetrafluoroethylene and methyl perfluoro (4,7-dioxa-5-methyl-8-nonenoate), from which the carboxylic acid form or the salt form can be obtained.

Generally, sulfonyl, carbonyl, sulfonate and carboxylate esters and sulfonyl and carbonyl based amide forms of the perfluorocarbon polymer composition are readily converted to ion exchange forms by a hydrolysis reaction. For example, the salt form can be obtained by treatment with a strong alkali such as NaOH and the acid form can then be generated by treatment with acid such as HCl. This conversion step can be carried out before or after the membrane substrate has been surface modified with the sulfonyl, carbonyl, sulfonate and carboxylate esters and sulfonyl and carbonyl based amide forms of the perfluorocarbon polymer composition.

Perfluorocarbon polymer composition used in the process of this invention need not be restricted to a particular equivalent weight, instead, any perfluorocarbon polymer having any equivalent weight may be used, as long as it binds to the membrane substrate surfaces. Additionally, any perfluorocarbon polymer composition having any equivalent weight may be used which results in a surface which wets with an aqueous liquid such as water. Generally the equivalent weight of the perfluorocarbon polymer is between about 150 and about 1500, more usually between about 600 and about 1250. The equivalent weight of a perfluorocarbon polymer is the average weight of one repeat unit of the polymer.

The aqueous solutions of a perfluorocarbon polymeric composition made in accordance with this invention can be prepared from a precursor solution wherein the perfluorocarbon polymer composition is dissolved in an organic solvent and water. The perfluorocarbon polymer becomes soluble in substantially 100% water when substantially all of the oroanic solvent is removed. That is, the presence of organic solvent is not necessary for the perfluorocarbon polymer composition to remain in solution in water even over extended time periods such as a month or a year. The aqueous solution can contain trace concentrations of organic solvents or of azeotropic compositions of water. In addition, the aqueous solution can contain solutes such as a salt, a base, an acid or mixtures thereof, if desired. Aqueous solutions of the perfluorocarbon polymer composition made directly from water without an organic solvent also can be utilized as a coating composition in the present invention.

The typical aqueous solution will have a pH of from about 2 to about 4. In one aspect of this invention, the aqueous solution can be modified by raising its pH such as with NaOH, KOH or the like to above about 4, preferably between about 7 and about 14. As further embodiment, one can add an acid, such as sulphuric acid, to modify the pH of the solution into the acid range. Additionally, the use of pressure to intrude the solution into the porous structure may be used with the initial aqueous solution or the adjusted solutions described above.

Suitable organic solvents can be utilized to form the perfluorocarbon polymer solution from which the membrane substrate surface modification is derived include the solvents disclosed by U.S. Pat. No. 4,386,987, which is incorporated herein by reference. The organic solvents generally have a vapor pressure greater than that of water so that they can be removed from an aqueous solution of the perfluorocarbon polymeric composition by evaporation by heat and/or subatmospheric pressure. The preferred solvents are the alcoholic solvents disclosed by U.S. Pat. No. 4,433,082 and 4,453,991 which are incorporated herein by reference. The alcoholic solvents include methanol, ethanol, n-propanol, isopropanol, n-butanol, 2-butanol, 2-methoxy ethanol, 2-ethoxy ethanol and mixtures thereof. The most preferred solvent as a preliminary solvent is a mixture of water and a lower alcohol such as isopropanol. The solutions of the perfluorocarbon polymers are formed at elevated temperature, typically 180° C. to 300° C., below the critical temperature of the solvent and at elevated pressure in a closed vessel. These solutions are miscible with solvents or diluents for the perfluorocarbon polymers, such as isopropanol, ethanol, water or the like, without precipitating the perfluorocarbon polymer. Water is added to the preliminarily formed solution.

The concentration of the perfluorocarbon polymer in the solution should be high enough to effect binding of the perfluorocarbon polymer to the polyperfluorocarbon substrate and to permit the resulting modified surface membrane to be directly wettable with water. Typically, the concentration of the perfluorocarbon polymer in the solution is between about 0.01 weight percent and about 10 weight percent, more usually between about 0.1 weight percent and about 5 weight percent.

The porous membrane substrate is formed of a polymeric composition which is not solvated or degraded by the solvent for the perfluorocarbon polymer composition. Typical membrane pore sizes are within the range of 0.01 microns to 10 microns. The porous substrate can have any convenient geometric configuration including a flat sheet, a corrugated sheet, a hollow fiber or the like. The porous substrate can be supported or unsupported, isotropic or anisotropic, skinned or unskinned, symmetric or asymmetric or can be a composite membrane. The porous membrane can be thin such as filtration membranes. The substrate is formed of a chemically inert polyperfluorocarbon. Representative suitable membrane or solid substrates comprise fluorine-containing polymers including polytetrafluoroethylene, fluorinated ethylene-propylene (FEP) copolymer or a pefluoroalkoxy polymer (PFA) or (MFA) or copolymers of ethylene and tetrafluoroethylene. The preferred membrane or solid substrates are formed from polytetrafluoroethylene, fluorinated ethylene-propylene copolymer or a perfluoroalkoxy polymer such as the group of polymers generally known as fluorocarbons marketed by E. I. Dupont de Nemours and Company, Inc. under the names Teflon® PTFE, Teflon® FEP and Teflon® PFA or amorphous forms of Teflon® polymers such as Teflon® AF polymer. Additional polymers which can have their surfaces modified in accordance with this invention include polyolefins, polyamides, polyaramides, polysulphones, polyesters, polycarbonates, polychlorotrifluoroethylene and polyvinylidene difluoride.

Alternatively, the membranes of this invention can be patterned so that a portion of the surface is rendered hydrophilic by the process of this invention while the untreated surface remains hydrophobic. Such a patterned membrane would be useful, for example as a membrane having gas venting capacity wherein gas could pass through the untreated portion of the membrane but not through the treated portion of the membrane. Aqueous liquid could pass through the treated portion of the membrane but not through the untreated portion of the membrane The bound surface modifying composition permits drying of the porous membrane and its subsequent reuse in contact with an aqueous composition to be filtered without the need for effecting the wetting of the membrane surface in a plurality of steps utilizing an organic solvent. The modified membrane surface is directly wet with an aqueous liquid, such as water, upon direct contact with the aqueous liquid. By the term "direct contact" as used herein is meant that a dry surface-modified membrane of this invention is wet with an aqueous liquid even when avoiding preliminary contact of the surface-modified membrane with an organic solvent or contact with an aqueous liquid under pressure to intrude the pores and while avoiding the use of shear force.

In a first step for forming a surface modified membrane of this invention, the unmodified membrane is contacted with a solvent which wets the membrane such as isopropanol, methanol, ethanol or the like. While the membrane is so-wet, the surface modified membrane of this invention is formed by contacting the entire surface or portions of the surfaces of the porous membrane substrate with an aqueous solution of the perfluorocarbon polymer composition which is substantially free of an organic solvent as described above under conditions wherein the substrate surfaces are wet with the solution while avoiding dewetting of the surface. Typically, contact of the membrane substrate with the aqueous solution is effected by immersion or by passing the aqueous solution through the membrane under a pressure differential or by intrusion. Optionally, an intermediate immersion step can be utilized wherein the membrane having its surface wet with an organic solvent is immersed in a dilute aqueous solution of a perfluorocarbon polymer composition free of an organic solvent. The solution contains a low concentration of the perfluorocarbon polymer composition of between about 0.001 and about 1.0 weight percent. This optional intermediate step assists in preventing the membrane to become dewet prior to contact with the treatment solution. The perfluorocarbon polymer composition becomes bound to the substrate surfaces to completely modify the contacted substrate surfaces and to render the surface wet by direct contact with water. A plurality of steps of contacting the substrate with the surface modifying composition can be effected in accordance with this invention.

The surface modified membrane is dried to remove the water and optionally heat treated to improve the strength of binding between the bound perfluorocarbon polymer composition and the membrane substrate. This drying and heat treatment can be effected in a single step. Heat treating is effected at a temperature which does not degrade the membrane substrate or the surface modifying composition. Generally, heat treating is conducted at a temperature between about 50° C. and about 350° C., more usually between about 80° C. and about 300° C. for a period of time between about 2 minutes and about 72 hours, more usually between about 5 minutes and about 24 hours.

The surface modified membranes of this invention are particularly useful for filtering aqueous liquids by directly wetting the membrane surface. Thus, since the membranes of this invention are inert, they are particularly useful for filtering chemically active aqueous liquids such as acids or bases including those that can contain an oxidizer. In these instances, both the membrane substrate and the surface modifying composition are highly resistant against chemical degradation while the resulting surface modified membrane is directly wet with water or the aqueous liquid to be filtered.

In addition, the membranes of this invention can be dried and then subsequently directly wet with water while avoiding the need for prior contact of the membrane with a water miscible organic solvent, such as a lower alcohol composition.

The following examples illustrate the present invention and are not intended to limit the same:

EXAMPLE 1

This example details the process for making an aqueous solution of a perfluorocarbon polymer in the free acid form.

A solution containing 5% Nafion® perfluorocarbon polymer in the free acid form, derived from a copolymer of a sulfonyl group-containing perfluorinated vinyl monomer and tetrafluoroethylene and having an equivalent weight of 980, in a mixture of lower aliphatic alcohols and water was obtained from E. I. du Pont de Nemours and Company.

The above solution was diluted with water to bring the concentration of the perfluorocarbon polymer to 3.3% while mixing, to result in a clear solution. This solution was then placed in a vacuum chamber at 28 inches of mercury for 16 hours at room temperature to volatilize the alcohols from the solution. This solution was then taken out of the vacuum chamber and placed on a hot plate and heated to the boiling point while mixing. The solution was boiled for 5 hours to further evaporate the remaining alcohol from the solution while adding water to prevent an excessive reduction in volume. The solution was removed from the hot plate and allowed to cool down to room temperature; water was added, while mixing, to adjust the concentration of the perfluorocarbon polymer to 3%. The solution was then passed through a coarse stainless steel screen to remove any large particulate matter.

The final solution was visibly colorless, clear and had no discernible odor of alcohols, suggesting that the solution was essentially an aqueous solution of the perfluorocarbon polymer. The concentration of the perfluorocarbon polymer in the solution was verified to be 2.8% by a gravimetric method.

EXAMPLE 2

This example illustrates the process for preparing a water-wettable polytetrafluoroethylene membrane modified with a perfluorocarbon polymer.

A 47 mm disk of a microporous polytetrafluoroethylene membrane having a nominal pore size of 0.1 μm was placed between two annular metal frames to restrain the membrane sample in place. The frames were then clipped together with binder clips so that the entire assembly can be manipulated easily by the frames or clips without the need to handle the exposed area of the membrane sample within the frames.

The membrane sample was wet with isopropyl alcohol (IPA) by placing one drop of IPA on one of the geometric surfaces of the membrane sample and spreading the drop over the exposed area of the membrane within the frames using the bulb of a disposable 7 ml polyethylene pipette. The drop was spread on the surface of the membrane by rubbing the pipette bulb gently over the membrane surface containing the drop of IPA. Using the same IPA-wet pipette bulb, the second geometric surface of the membrane was rubbed in a similar manner. The membrane became wet with IPA as visualized by the membrane becoming transparent from its original opaque state. Once the membrane was completely wet with IPA and before the IPA evaporates completely, one drop of the aqueous solution of the perfluorocarbon polymer of example 1 was applied to one of the geometric surfaces of the membrane sample. The drop of solution was continuously spread over the exposed area of the membrane with a pipette bulb as described earlier for about 3 minutes to avoid beading up of the solution on the membrane surface which results in dewetting of the membrane. Likewise, a second drop of the same solution was then applied to the second geometric surface of the membrane followed by spreading of the drop. Rubbing of both surfaces of the wet membrane with the pipette bulb continued for an additional 6 minutes until a thin, uniform and continuous film of the aqueous perfluorocarbon polymer solution was formed on both surfaces of the membrane. The membrane was then air dried under an air blower at room temperature; the membrane became opaque from its transparent state in the wet form.

A drop of water was placed on each geometric surface of the dry membrane. The areas of the membrane which were in direct contact with the water drops, became wet with water as visualized by the membrane becoming transparent. This change in appearance from opaque in the dry state, to transparent in the wet state, occurs as the water enters and fills the pores within the porous structure of the membrane. The membrane sample was then removed from the metal frames and placed on a dish containing water. The entire area of the membrane, which was treated with the perfluorocarbon polymer solution, was observed to directly wet with water.

EXAMPLE 3

This example details the process for making an aqueous solution of a perfluorocarbon polymer in the lithium salt form.

An aqueous solution of Nafion® perfluorocarbon polymer in the lithium salt form was prepared by adding 0.01 g of lithium hydroxide to 3.5 g of the aqueous solution of the perfluorocarbon polymer of example I and mixed thoroughly while heating to form a clear solution. The solution was then allowed to cool down to room temperature.

The aqueous solution of the lithium salt form of the perfluorocarbon polymer was clear, colorless to slightly yellowish and had a pH of 12.

EXAMPLE 4

This example illustrates the process for preparing a water-wettable polytetrafluorethylene membrane with a perfluorocarbon polymer.

A 47 mm disk of a microporous polytetrafluoroethylene membrane having a nominal pore size of 0.1 $\mu$m was restrained within metal frames as in example 2.

The membrane sample was wet with isopropyl alcohol (IPA) by placing one drop of IPA on one of the geometric surfaces of the membrane sample and spreading the drop over the exposed area of the membrane within the frames using the bulb of a disposable 7 ml polyethylene pipette. The drop was spread on the surface of the membrane by rubbing the pipette bulb gently over the membrane surface containing the drop of IPA. Using the same IPA-wet pipette bulb, the second geometric surface of the membrane was rubbed in a similar maimer. The membrane became wet with IPA as visualized by the membrane becoming transparent from its original opaque state. Once the membrane was completely wet with IPA and before the IPA evaporates completely, one drop of the aqueous solution of the perfluorocarbon polymer of example 3 was applied to one of the geometric surfaces of the membrane. The drop of solution was continuously spread over the exposed area of the membrane with a pipette bulb as described earlier for about 3 minutes to avoid beading up of the solution on the membrane surface which results in dewetting of the membrane. Likewise, a second drop of the same solution was then applied to the second geometric surface of the membrane followed by spreading of the drop. Rubbing of both surfaces of the wet membrane with the pipette bulb continued for an additional 6 minutes until a thin, uniform and continuous film of the aqueous perfluorocarbon polymer solution was formed on both surfaces of the membrane. The wet membrane was then placed in an oven set at 135° C. for 15 minutes to dry; the membrane became opaque from its transparent state in the wet form. The dry membrane was then removed from the oven and allowed to cool down to room temperature.

A drop of water was placed on each geometric surface of the dry membrane. The areas of the membrane, which were in direct contact with the water drops, became wet with water as visualized by the membrane becoming transparent. The membrane sample was then removed from the metal frames and placed on a dish containing water. The entire area of the membrane, which was treated with the perfluorocarbon polymer solution, was observed to directly wet with water. The unmodified area of the membrane, which was not contacted with the aqueous solution of the perfluorocarbon polymer composition, such as the area of the membrane under the metal frame, did not wet with water.

EXAMPLE 5

This example shows that a water-wettable polytetrafluoroethylene membrane modified with a perfluorocarbon polymer can be directly re-wet with water.

The water-wet membrane sample from experiment 4 was further rinsed with water three times for 3 minutes each and then allowed to dry at room temperature.

A drop of water was placed on each geometric surface of the dry membrane. The areas of the membrane, which were in direct contact with the water drops, became wet with water as visualized by the membrane becoming transparent. The membrane sample was then placed on a dish containing water. The entire area of the membrane, which was treated with the perfluorocarbon polymer solution, was observed to directly wet with water.

EXAMPLE 6

This example shows that a polytetrafluoroethylene membrane modified with a perfluorocarbon polymer remains water-wettable even after extended exposures to high temperatures.

A 47 mm disk of a microporous polytetrafluoroethylene membrane having a nominal pore size of 0.1 $\mu$m was restrained within metal frames as in example 2.

The membrane sample was modified with a perfluorocarbon polymer according to the process of example 4 except that the membrane was dried at 135° C. for 16 hours instead of 15 minutes.

A drop of water was placed on each geometric surface of the dry membrane. The areas of the membrane, which were in direct contact with the water drops, became wet with water as visualized by the membrane becoming transparent. The membrane sample was then removed from the metal frames and placed on a dish containing water. The entire area of the membrane, which was treated with the perfluorocarbon polymer solution, was observed to directly wet with water.

EXAMPLE 7

This example illustrates the process for preparing a water-wettable membrane made from a perfluoroalkoxy resin and further modified with a perfluorocarbon polymer.

A sample of MFA™ microporous membrane was prepared from the perfluoroalkoxy polymer Hyflon™ 620 resin obtained from Ausimont, USA, Inc. according to the teachings of U.S. Pat. No. 5,032,274 and 4,990,294. A 47 mm disk of the membrane was restrained within metal frames as in example 2.

The membrane sample was modified with a perfluorocarbon polymer according to the process of example 4.

A drop of water was placed on each geometric surface of the dry membrane. The areas of the membrane, which were in direct contact with the water drops, became wet with water as visualized by the membrane becoming transparent. The membrane sample was then removed from the metal frames and placed on a dish containing water. The entire area of the membrane, which was treated with the perfluorocarbon polymer solution, was observed to directly wet with water.

EXAMPLE 8

This example illustrates the process for preparing a water-wettable membrane made from a perfluoroalkoxy resin and further modified with a perfluorocarbon polymer.

A sample of biaxially stretched Teflon® PFA microporous membrane was prepared form the perfluoroalkoxy polymer Teflon® PFA TE 9725 resin obtained from E.I. duPont de Nemours and Company according to the teachings of U.S. Pat. No. 5,032,274 and 4,990,294. A 47 mm disk of the membrane was restrained within metal frames as in example 2.

The membrane sample was modified with a perfluorocarbon polymer according to the process of example 4.

A drop of water was placed on each geometric surface of the dry membrane. The areas of the membrane, which were in direct contact with the water drops, became wet with water as visualized by the membrane becoming transparent. The membrane sample was then removed from the metal frames and placed on a dish containing water. The entire area of the membrane, which was treated with the perfluorocarbon polymer solution, was observed to directly wet with water.

What is claimed is:

1. A porous membrane product comprising a porous perfluorocarbon substrate having its surface completely modified with a bound perfluorocarbon copolymer composition which is directly bonded to said substrate, said bound perfluorocarbon copolymer composition having hydrophilic functional groups and being directly wet upon contact with water.

2. A porous membrane product comprising a porous polyfluorocarbon substrate having a first portion of its surface unmodified and a second portion of its surface completely modified with a bound perfluorocarbon copolymer composition which is directly bonded to said substrate, said bound perfluorocarbon copolymer composition having hydrophilic functional groups and being directly wet with water.

3. A porous membrane product comprising a porous polyperfluorocarbon membrane substrate having a first portion of its surface unmodified and a second portion of its surface modified with a bound perfluorocarbon polymer composition having hydrophilic functional groups and being directly wettable upon contact with an aqueous liquid.

4. The membrane product of any one of claims 1, 2, or 3 wherein said perfluorocarbon polymer composition contains at least one of the following functional groups ($SO_2F$), ($SO_3M$), ($SO_3R$), ($SO_2NR_2$), $PO_3M$, (COF), ($CO_2M$), ($CO_2R$) or ($CONR_2$), wherein M is H, an alkali metal, an alkaline earth metal, or $NR_4$ and each R separately is H, an alkyl group or an aryl group, or a substituted alkyl or substituted aryl group.

5. The membrane product of any one of claims 1, 2 or 3 wherein said polyperfluorocarbon substrate is polytetrafluoroethylene.

6. The membrane product of any one of claims 1, 2 or 3 wherein said polyperfluorocarbon substrate is a perfluoroalkoxy polymer.

7. The membrane product of any one of claims 1, 2 or 3 wherein said polyperfluorocarbon substrate is a fluorinated ethylene-propylene copolymer.

8. A process for forming a porous membrane product comprising a polyperfluorocarbon membrane substrate having deposited thereon over its complete surface a perfluorocarbon copolymer composition, said surface being directly wettable with aqueous liquids which comprises:

a) wetting the entire surface of said membrane substrate with an organic solvent composition, b) contacting an aqueous solution containing a perfluorocarbon copolymer composition with the entire surface of said polyperfluorocarbon substrate to effect deposition of said perfluorocarbon copolymer composition directly onto the entire surface of said polyperfluorocarbon membrane substrate and (c) drying said substrate from step (b).

9. A process for fonning a porous membrane product comprising a polyperfluorocarbon substrate having deposited thereon over a first portion of its a surface a perfluorocarbon copolymer composition and a second portion of its surface unmodified, said first portion of its a surface completely modified with said perfluorocarbon copolymer composition and being directly wettable with water aqueous liquids which comprises:

a) wetting a surface of said membrane substrate with an organic solvent composition, b) contacting an aqueous solution containing a perfluorocarbon copolvmer composition with said first portion of the polyperfluorocarbon membrane substrate to effect deposition of said perfluorocarbon copolymer composition directly onto said first portion of the polyperfluorocarbon membrane substrate while avoiding contact of an aqueous solution with said second portion of said polyperfluorocarbon membrane substrate and c) drying said substrate from step (b).

10. The process of any one of claims 8 or 9 wherein said porous polyperfluorocarbon membrane substrate is polytetrafluoroethylene.

11. The process of any one of claims 8 or 9 wherein said porous polyperfluorocarbon membrane substrate is a perfluoroalkoxy polymer.

12. The process of any one of claims 8 or 9 wherein said porous polyperfluorocarbon membrane substrate is a fluorinated ethylene-propylene copolymer.

13. The process of any one of claims 8 or 9 wherein said perfluorocarbon polymer composition contains at least one of the following functional groups ($SO_2F$), ($SO_3M$), ($SO_3R$), ($SO_2NR_2$), $PO_3M$, (COF), ($CO_2M$), ($CO_2R$) or ($CONR_2$), wherein M is H, an alkali metal, an alkaline earth metal, or $NR_4$ and each R separately is H, an alkyl group or an aryl group, or a substituted alkyl or substituted aryl group.

14. The process of any one of claims 8 or 9 wherein said substrate having said perfluorocarbon polymer deposited on said surface is heat treated.

15. The process of any one of claims 8 or 9 wherein said aqueous solution includes a solute in addition to said perfluorocarbon polymer composition.

16. A porous membrane having a hydrophilic surface which comprises a polyperfluorocarbon substrate having both external surfaces and internal pore defining surfaces, and having a perfluorocarbon polymer composition having hydrophilic functional groups deposited on at least a portion of said external surfaces and on at least a portion of the internal pore defining surfaces while leaving the pores open for passage of fluid through the pores, said modified surfaces being directly wettable upon contact with an aqueous liquid.

* * * * *